United States Patent [19]
Exum et al.

[11] Patent Number: 5,251,397
[45] Date of Patent: Oct. 12, 1993

[54] ILLUMINATED FLEA TRAP

[75] Inventors: Joe Exum, Snow Hill; Jess Mellenthin, Oxford, both of N.C.

[73] Assignee: Happy Jack, Inc., Snow Hill, N.C.

[21] Appl. No.: 848,374

[22] Filed: Mar. 9, 1992

[51] Int. Cl.⁵ .............................................. A01M 1/04
[52] U.S. Cl. .................................... 43/115; 43/114; 43/113
[58] Field of Search ................. 43/113, 114, 115, 107

[56] References Cited

U.S. PATENT DOCUMENTS

| | | | |
|---|---|---|---|
| 4,074,457 | 2/1978 | Sato et al. | 43/114 X |
| 4,086,721 | 5/1978 | Deas | 43/113 |
| 4,395,842 | 8/1983 | Margulies | 43/114 |
| 4,566,220 | 1/1986 | Justice | 43/113 |
| 4,685,244 | 8/1987 | Marks | 43/114 X |
| 4,686,789 | 8/1987 | Williams | 43/114 X |
| 4,700,506 | 10/1987 | Williams | 43/113 |
| 4,841,669 | 6/1989 | Demarest et al. | 43/114 X |

Primary Examiner—Kurt C. Rowan
Assistant Examiner—Kenneth J. Hansen
Attorney, Agent, or Firm—Shefte, Pinckney & Sawyer

[57] ABSTRACT

An illuminated flea trap having a tray and a cover injection-molded of thermoplastic material, one a duplicate of the other, each having support members formed integrally therewith are mounted in spaced vertical relation to one another using the support members, the cover having an electric light mounted thereto. The cover is formed of a lightly colored translucent material allowing the cover to act as a light diffuser providing a glowing surface for enhanced flea attraction, and sheet material having an adhesive on one surface thereof is placed in the tray for trapping fleas that are attracted to the light and leap into the tray.

15 Claims, 3 Drawing Sheets

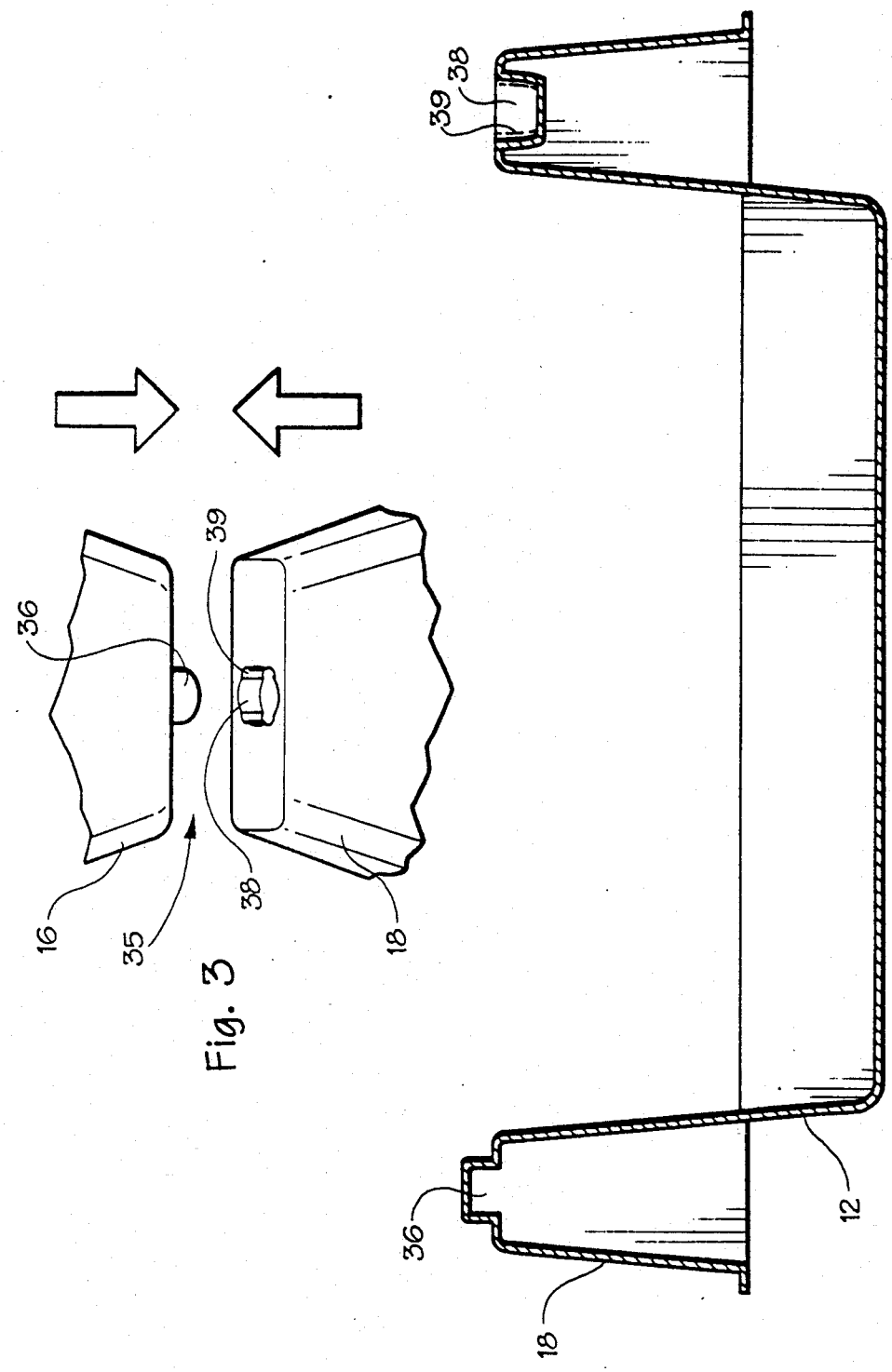

ILLUMINATED FLEA TRAP

BACKGROUND OF THE INVENTION

The present invention relates broadly to insect traps and more particularly to a trap for catching fleas utilizing a light emitting source that is activated to act as a lure.

Insects are known to be attracted to light and illuminated traps for attracting and trapping flying insects are known in the art. An example of this type of trap is Boobar et al U.S. Pat. No. 4,788,789 which teaches a trap for flying insects that is tripod mounted and utilizes a suction fan to prevent flying insects which have been attracted to the light from leaving the trapping area. The suction fan also chops the insects to bits and deposits the remains in a receptacle provided therefor. Fleas, unlike flying insects, move by leaping or hopping from position to position because they are wingless. Therefore, a trap for fleas must take into account considerations that are not relevant to traps for flying insects. For example, a flea trap must be accessible to fleas that hop from a source such as a carpet infested therewith.

Accordingly, traps for capturing fleas typically must sit on or near the floor and provide easy access for hopping fleas. Traps of this type include Justice U.S. Pat. No. 4,566,220 which utilizes a pan containing a sticky liquid, having a cover and an energized green light source attached to the cover. Other examples include Williams U.S. Pat. No. 4,700,506 and Williams U.S. Pat. No. 4,686,789. These traps use a shallow pan having a cover mounted in spaced vertical relation with the pan and a light source mounted to the cover.

While the prior art traps perform admirably, improvements can be made in both operational performance and manufacturing efficiency. The opaque cover blocks light and therefore may hinder the attraction of insects to the trap. If the trap could be further illuminated, insect attraction could be enhanced. With regard to manufacturing concerns, by using different configurations for the cover and the trapping pan, additional tooling and manufacturing steps are required. In addition, using separately constructed cover support legs, formed of a different material than the cover and trapping pan, results in still further tooling and materiel requirements.

SUMMARY OF THE INVENTION

It is accordingly an object of the present invention to provide an illuminated flea trap that includes a tray and a cover of like configuration having support legs formed integrally therewith. More particularly, the present invention provides an illuminated flea trap having a cover which is formed of a lightly colored translucent material so that when the light source is illuminated, light is diffused through the translucent cover panel illuminating the surface thereof in a glowing manner.

In the preferred embodiment of the present invention, the flea trap comprises a tray having a generally planar wall portion forming a generally shallow insect trapping area, the tray having a plurality of support members formed integrally with and projecting away from the wall portion, and a cover having a generally planar wall portion and a plurality of support members formed integrally with and projecting away from the wall portion. The cover is formed of a generally lightly colored translucent material, the tray and cover being of a generally identical configuration and construction. The present invention also includes an assembly for detachably connecting the cover to the tray in spaced vertical relation therewith, a light emitting arrangement mounted to the cover for attracting insects by illuminating the cover and the area around the apparatus, and being positioned on the cover so that when the light emitting arrangement is illuminated, light is diffused through the translucent material of the cover thereby illuminating the outer surface thereof in a glowing manner for enhanced insect attraction. Preferably, the light emitting assembly comprises an electric light bulb having a socket mounted to the cover.

In addition, the present invention also includes an adhesive arrangement removably disposed in the insect trapping area for retaining insects which are attracted to the light emitting arrangement and enter the insect trapping area, thereby becoming adhered to the adhesive arrangement which retains the insects so that they may be disposed of by removal of the adhesive arrangement. The adhesive arrangement preferably includes a sheet of material having an adhesive affixed to at least one side thereof, the sheet being interchangeable with other like sheets in the insect trapping area.

Preferably, the arrangement for detachably connecting the cover to the tray comprises the combination of a protuberance projecting outwardly from and formed integrally with the outward ends of selected support members and a recess formed in the outward ends of other selected support members arranged so that when the cover is attached to the tray, the protuberances engage the recesses, which recesses generally conform to the protuberances and include a gripping arrangement for detachably retaining the protuberances therein. The gripping arrangement includes ridges formed in the side walls of the recesses adjacent the openings thereof and the protuberances are tapered so that the outward ends thereof are of a greater diameter than the base thereof. The ridges are sufficiently elastic for deformation and subsequent reformation thereof to occur when the protuberances are inserted in the recesses, the compressive force exerted by the ridges acting in concert with the tapered protuberances to retain the support members in abutting relation.

It is further preferred that the cover and tray wall portions are generally surrounded by a plurality of side wall portions formed integrally with and projecting away from the tray and cover wall portions. The side wall portions are formed integrally with the aforesaid support members and project away therefrom and the support members are of a generally trapezoidal configuration. Preferably, the cover and tray, including the support members projecting therefrom, are each integrally fabricated of a thermoplastic material.

BRIEF DESCRIPTION OF THE DRAWINGS

FIG. 3 is a perspective view of the gripping assembly formed integrally with the support members of the illuminated insect trap illustrated in FIG. 1;

FIG. 4 is a side elevational view, partly in section, of the tray portion of the insect trap of the present invention.

DESCRIPTION OF THE PREFERRED EMBODIMENT

Figure 1:
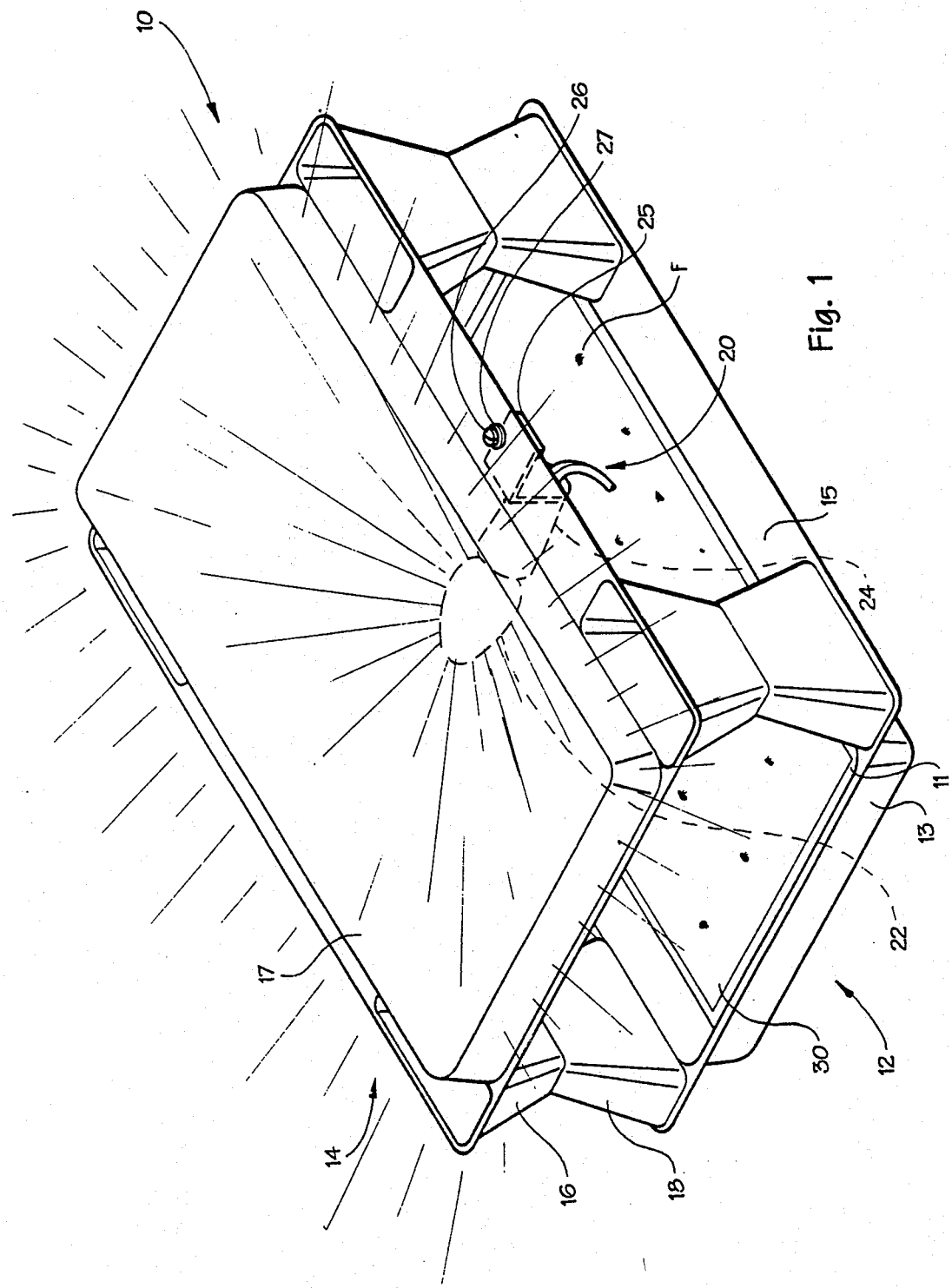
FIG. 1 is a perspective view of a an illuminated flea trap according to a preferred embodiment of the present invention.

Looking now in greater detail at the accompanying drawings and particularly at FIG. 1, an illuminated insect trap according to a preferred embodiment of the present invention is illustrated and indicated generally at 10, and it includes a tray 12 having a cover 14 mounted thereon. The cover 14 is positioned in spaced vertical relation with the tray 12 utilizing the cover support members 16 and the tray support members 18 in a mating relation. A light emitting assembly 20 is mounted to the cover 14 along one side edge thereof. An adhesive sheet 30 having adhesive material applied to the exposed surface thereof is removably disposed in the tray 12.

Figure 2:
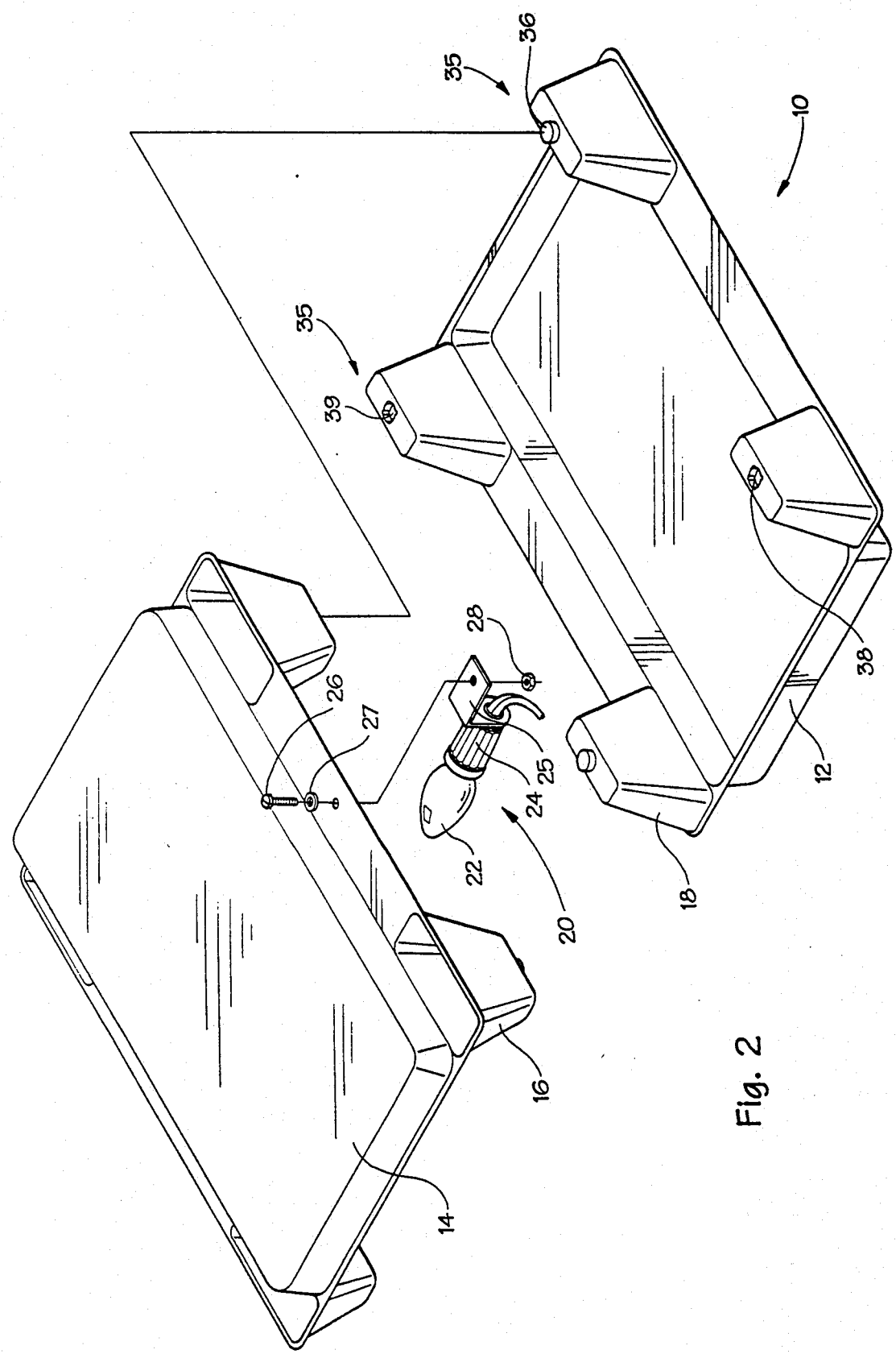
FIG. 2 is an exploded perspective view of the illuminated flea trap illustrated in FIG. 1.

The tray 12 is a generally rectangular shallow pan having a flat, generally rectangular lower surface 11 with side wall portions 13 projecting upwardly around all four sides thereof forming a shallow flea trapping area. The two longer side wall portions have thereattached a generally horizontally oriented, planar edge portion 15 extending outwardly therefrom. Generally trapezoidally shaped support members 18 project upwardly from the edge portion 15 at each corner of the tray 12 and are formed integrally with the edge portion 15. As seen in FIG. 2, each support member 18 has a generally flat upper surface with a gripping assembly 35 formed integrally therewith. The gripping assembly 35 will be explained in greater detail presently.

The cover 14 is a duplicate of the tray 12 and both are preferably injection-molded and formed of a cross-sectionally thin thermoplastic material, as shown in FIG. 4. Accordingly, the cover 14 and the tray 12 are interchangeable and one may serve the function of the other. As can best be seen in FIG. 1, the cover 14 includes all the aspects of the tray 12 as previously described and mounts on the tray support members 18 with the surfaces of the downwardly projecting cover support members 16 in mating relation with the upper surfaces of the upwardly projecting tray support members 18. As a result, the upper surface 17 of the cover 14 is in spaced vertical relation with the lower surface 11 of the tray 12 when the flea trap is assembled.

Duplication of the tray 12 to provide the cover 14 greatly increases the efficiency of manufacture and ease of assembly by the ultimate user. Whereas prior flea traps of this type included separate and dissimilar cover, tray, and support leg assemblies, often formed of dissimilar materials, the present invention offers two identical pieces to serve the same function. Accordingly, it makes no difference to the user which unit is used for the cover 14 or the tray 12. As such, any structural description of the cover 14 applies equally to the tray 12 and vice versa.

In order to attract fleas, the aforesaid light emitting assembly 20 includes a small light socket 24 that is mounted to the cover 14 along one of the planar edge portions 15 utilizing a bracket 25 and a conventional nut 28, bolt 26, and washer 27. The socket 24 is occupied by a small lamp 22 which extends inwardly in the space intermediate the cover 14 and tray 12.

One unique feature of the present invention is the enhanced insect attraction offered by the ability of the cover 14 to glow when illuminated. As seen in FIG. 4, and as previously mentioned, the cover is formed of a cross-sectionally thin, preferably thermoplastic, material which is lightly colored, preferably white, and generally translucent. The thin, translucent material will act as a diffuser to light so that when the lamp 22 is illuminated, the outer surface 17 of the cover 14 will glow with diffused light. The glowing cover 14 provides enhanced flea attraction.

As previously mentioned, the cover support members 16 and the tray support members 18 are all formed with one selected component of a two-component gripping arrangement 35 in the outward surfaces thereof to provide a locking mechanism for securing the cover 14 and the tray 12 in a vertically spaced mating relation with one another. With reference to FIGS. 2 and 3, the components of the gripping assembly 35, formed in all eight support members 16,18, include a protuberance 36 projecting outwardly from four selected support members 16,18 and a recess 38 formed in the other four selected support members 16,18. Each support member 16,18 in diagonal opposition to one another includes a like gripping assembly component so that, due to the rectangular shape of the cover 14 and tray 12, and the side-by-side relation of the support members 16,18, a recess 38 is in side-by-side relation with a protuberance 36. When the cover 14 is in position for attachment to the tray 12, the protuberances 36 are aligned in a facing relation with the recesses 38 and are therefore in position for mating.

With reference to FIG. 3, mating of the recesses 38 with the protuberances 36 results in a detachably locked union of the cover 14 and the tray 12. A representative protuberance 36 is formed as a slightly tapered cylinder so that the outermost portion thereof has a slightly greater diameter than the innermost portion thereof. Each recess 38 is formed as a generally cylindrical well having a plurality of elastically deformable ridges 39 formed therein, interrupting the smooth cylinder wall of the recess 38 near the opening thereof. Insertion of the protuberance 36 into the recess 38 results in elastic deformation of the ridges 39 as the greater diameter outer surface of the protuberance 36 passes thereby. When the protuberance 36 is in the recess 38, the compressive force offered by the ridges 39 retains each protuberance 16, thereby locking the cover 14 onto the tray 12.

Operation of the illuminated flea trap of the present invention is generally as follows. With reference to FIG. 1, the assembled flea trap is placed on a floor or other surface accessible to fleas in an area frequented by fleas, with the lamp 22 illuminated. The glowing cover 14 will attract fleas F thereto. The fleas, which hop or leap for locomotion, leap over the side wall portions 13 into the flea trapping area where they encounter the adhesive sheet 30. Fleas F remain adhered to the sheet 30 and cannot escape. Once the desired number of fleas F are adhered to the sheet 30, the sheet 30 may be removed and discarded, along with the fleas F adhered thereto. A new adhesive sheet 30 is then placed in the tray 12 and the flea trap returned to service.

The present invention provides an illuminated flea trap that is easy and inexpensive to manufacture, is simple for the user to assemble, and provides enhanced flea trapping ability due the light diffusing material of which the cover 14 is formed.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An apparatus for attracting and trapping insects and retaining the trapped insects for later disposal thereof comprising:
   (a) a tray having a generally planar tray wall portion forming an insect trapping area, said tray having a plurality of support members formed integrally with and projecting away from said tray wall portion;
   (b) a cover having a generally planar cover wall portion and a plurality of support members formed integrally with and projecting away from said cover wall portion, and engaging said support members of said tray, said cover being formed of a generally lightly colored translucent material that will diffuse light to present a glowing appearance on the outer surface thereof when illuminated;
   (c) means for detachably connecting said cover to said tray in spaced vertical relation therewith;
   (d) light emitting means mounted to said cover for attracting insects by illuminating the area around said apparatus and being positioned on said cover to cause said emitted light to be diffused through said translucent material of said cover for illuminating the outer surface thereof presenting a glowing appearance for enhanced insect attraction; and
   (e) adhesive means removably disposed in said insect trapping area for retaining insects which are attracted to said light emitting means and enter said insect trapping area thereby becoming adhered to said adhesive means, which retains the insects so that they may be disposed of by removal of said adhesive means.

2. An apparatus for attracting and trapping insects according to claim 1 wherein said tray and said cover are of a generally identical configuration and construction.

3. An apparatus for attracting and trapping insects according to claim 1 wherein said means for detachably connecting said cover to said tray comprises the combination of a protuberance projecting outwardly from and formed integrally with the outward ends of selected support members and a recess formed in the outward ends of other selected support members arranged so that when said cover is attached to said tray, said protuberances engage said recesses.

4. An apparatus for attracting and trapping insects according to claim 3 wherein said recesses include gripping means having ridges formed in the side walls of said recesses adjacent the openings thereof, and wherein said protuberances are tapered so that the outward ends thereof are of a greater diameter than the base thereof, said ridges being sufficiently elastic for deformation and subsequent reformation thereof to occur when said protuberance is inserted in said recess, said ridges acting in concert with said tapered protuberances to retain said support members in abutting relation.

5. An apparatus for attracting and trapping insects according to claim 1 wherein said cover wall portion and said tray wall portion are generally surrounded by a plurality of side wall portions formed integrally with and projecting away from each of said cover wall portion and said tray wall portion, said side wall portions being formed integrally with a plurality of said support members projecting away therefrom, said support members being of a generally trapezoidal configuration.

6. An apparatus for attracting and trapping insects according to claim 1 wherein said cover and said tray, and said support members projecting therefrom, are each integrally fabricated of a thermoplastic material.

7. An apparatus for attracting and trapping insects according to claim 1 wherein said light emitting means comprises an electric light bulb having a socket mounted to said cover.

8. An apparatus for attracting and trapping insects according to claim 1 wherein said adhesive means includes a sheet of material having an adhesive affixed to at least one side thereof, said sheet being interchangeable with other like sheets in said insect trapping area.

9. An apparatus for attracting and trapping insects and retaining the trapped insects for later disposal thereof comprising:
   (a) a tray having a tray wall portion forming a generally shallow insect trapping area, said tray having a plurality of support members formed integrally with and projecting away from said tray wall portion;
   (b) a cover having a cover wall portion and a plurality of support members formed integrally with and projecting away from said cover wall portion, said cover being formed of a generally lightly colored translucent material;
   (c) means for detachably connecting said cover to said tray in spaced vertical relation therewith;
   (d) light emitting means mounted to said cover for attracting insects by illuminating the area around said apparatus, and being positioned on said cover to cause said emitted light to be diffused through said translucent material of said cover for illuminating the outer surface thereof presenting a glowing appearance for enhanced insect attraction; and
   (e) adhesive means removably disposed in said insect trapping area for retaining insects which are attracted to said light emitting means and enter said insect trapping area thereby becoming adhered to said adhesive means, which retains the insects so that they may be disposed of by removal of said adhesive means.

10. An apparatus for attracting and trapping insects and retaining the trapped insects for later disposal thereof comprising:
   (a) a tray having a generally planar wall portion forming a shallow insect trapping area;
   (b) a cover disposed in spaced vertical relation with said tray, said cover being formed of a generally lightly colored translucent material to present a glowing appearance on the outer surface thereof when illuminated;
   (c) light emitting means mounted to said cover for attracting insects by illuminating the area around said apparatus, and being positioned on said cover to cause said emitted light to be diffused through said translucent material of said cover for illuminating the outer surface thereof presenting a glowing appearance for enhanced insect attraction; and (d) adhesive means removably disposed in said insect trapping area for retaining insects which are attracted to said light emitting means and enter said insect trapping area thereby becoming adhered to said adhesive means, which retains the insects so that they may be disposed of by removal of said adhesive means.

11. An apparatus for attracting and trapping insects according to claim 10 wherein said cover and said tray are each integrally fabricated of a thermoplastic material.

12. An apparatus for attracting and trapping insects according to claim 10 wherein said light emitting means comprises an electric light bulb having a socket mounted to said cover.

13. An apparatus for attracting and trapping insects according to claim 10 wherein said adhesive means includes a sheet of material having an adhesive affixed to at least one side thereof, said sheet being interchangeable with other like sheets in said insect trapping area.

14. An apparatus for attracting and trapping insects and retaining the trapped insects for later disposal thereof comprising:

(a) a tray having a generally planar wall portion forming a shallow insect trapping area;

(b) a cover disposed in spaced vertical relation with said tray, said cover being formed of a generally lightly colored translucent material to present a glowing appearance on the outer surface thereof when illuminated;

(c) means for detachably connecting said cover to said tray to maintain said cover in a spaced vertical relation with said tray;

(d) light emitting means mounted to said cover for attracting insects by illuminating said translucent cover and the area around said apparatus; and (e) adhesive means removably disposed in said insect trapping area for retaining insects which are attracted to said light emitting means and enter said insect trapping area thereby becoming adhered to said adhesive means, which retains the insects so that they may be disposed of by removal of said adhesive means.

15. An apparatus for attracting and trapping insects and retaining the trapped insects for later disposal thereof comprising:

(a) a tray having a generally planar tray wall portion forming a generally shallow insect trapping area, said tray wall portion being generally surrounded by a plurality of side wall portions formed integrally with and projecting away from said tray wall portion, said side wall portions being formed integrally with a plurality of support members projecting away therefrom;

(b) a cover having a generally planar cover wall portion surrounded by a plurality of side wall portions formed integrally with and projecting away from said cover wall portion, said side wall portions being formed integrally with a plurality of support members projecting away therefrom, said cover wall portion being formed of a generally lightly colored translucent material to present a glowing appearance when illuminated, and said tray and said cover being of a generally identical configuration and construction;

(c) means for detachably connecting said cover wall portion to said tray wall portion in spaced vertical relation therewith including the combination of a protuberance projecting outwardly from and formed integrally with the outward ends of selected support members and a recess formed in the outward ends of other selected support members arranged so that when said cover is attached to said tray, said protuberances engage said recesses, said recesses generally conforming to said protuberances and having gripping means for detachably retaining said protuberances therein, said gripping means including ridges formed in the side walls of said recesses adjacent the openings thereof, said protuberances being tapered so that the outward ends thereof are of a greater diameter than the base thereof, said ridges being sufficiently elastic for deformation and subsequent reformation thereof to occur when said protuberance is inserted in said recess, said ridges acting in concert with said tapered protuberances to retain said support members in abutting relation;

(d) light emitting means including an electric light bulb having a socket mounted to said cover wall portion for attracting insects by illuminating the area around said apparatus and being positioned on said cover wall portion to cause said emitted light to be diffused through said translucent material of said cover wall portion for illuminating the outer surface thereof to provide a glowing appearance for enhanced insect attraction; and (e) adhesive means including a sheet of material having an adhesive fixed to at least one side thereof disposed in said insect trapping area for retaining insects which are attracted to said light emitting means and enter said insect trapping area thereby becoming adhered to said adhesive means, which retains the insects so that they may disposed of by removal of said adhesive means, said adhesive means being interchangeable with other like sheets in said insect trapping area.

* * * * *